(12) United States Patent
Maiworm et al.

(10) Patent No.: US 11,717,775 B2
(45) Date of Patent: Aug. 8, 2023

(54) LIQUID DISCHARGE FILTER AND ITS USE

(71) Applicant: Cargill, Incorporated, Wayzata, MN (US)

(72) Inventors: Michael Maiworm, Hamburg (DE); Armin Willem-Friedrich Hermann Tarnow, Rotterdam (NL)

(73) Assignee: Cargill, Incorporated, Wayzata, MN (US)

( * ) Notice: Subject to any disclaimer, the term of this patent is extended or adjusted under 35 U.S.C. 154(b) by 14 days.

(21) Appl. No.: 16/973,297

(22) PCT Filed: Jun. 11, 2019

(86) PCT No.: PCT/US2019/036553
§ 371 (c)(1),
(2) Date: Dec. 8, 2020

(87) PCT Pub. No.: WO2019/241248
PCT Pub. Date: Dec. 19, 2019

(65) Prior Publication Data
US 2021/0245078 A1    Aug. 12, 2021

(30) Foreign Application Priority Data
Jun. 13, 2018  (EP) ..................................... 18177486

(51) Int. Cl.
*B01D 29/94* (2006.01)
*A23D 9/04* (2006.01)
(Continued)

(52) U.S. Cl.
CPC ............... *B01D 29/94* (2013.01); *A23D 9/04* (2013.01); *B01D 29/05* (2013.01); *B01D 29/52* (2013.01);
(Continued)

(58) Field of Classification Search
None
See application file for complete search history.

(56) References Cited

U.S. PATENT DOCUMENTS

| 955,836   | A | * | 4/1910  | Moore   | B01D 37/00  |
|-----------|---|---|---------|---------|-------------|
|           |   |   |         |         | 23/307      |
| 1,696,735 | A | * | 12/1928 | Scoville | B01D 29/39 |
|           |   |   |         |         | 210/418     |

(Continued)

FOREIGN PATENT DOCUMENTS

| AU | 2016320582 A1 * | 4/2018  | .......... B01D 29/114 |
|----|-----------------|---------|------------------------|
| CN | 202478697 U     | 10/2012 |                        |

(Continued)

OTHER PUBLICATIONS

"International Application Serial No. PCT/US2019/036553, International Search Report dated Sep. 4, 2019", 3 pgs.

(Continued)

*Primary Examiner* — Robert J Popovics

(57) ABSTRACT

A filter system and filtration process for obtaining a filtered liquid and slurrifying a filter cake and whereby the filter cake is slurrified under such conditions that the solids of the slurrified filter cake maintain a suitable quality for being re-used. The filter system has a housing (1) comprising an aperture (6) for liquid containing solids, and a discharge outlet (5) and is characterized in that the housing (1) of the filter system is comprising a slurrification section (3) and at least one filter element (2) having two sides wherein one side is suitable for building up a filter cake and another sides is suitable for contact with filtered liquid, and the slurrification section is comprising at least one nozzle (4) for steam or gas injection and the discharge outlet (5) is suitable for discharging a slurry.

7 Claims, 2 Drawing Sheets

(51) Int. Cl.
   *B01D 29/05*  (2006.01)
   *B01D 29/52*  (2006.01)
   *B01D 29/84*  (2006.01)
   *C11B 3/00*   (2006.01)
   *C11B 3/10*   (2006.01)
   *B01D 36/00*  (2006.01)

(52) U.S. Cl.
   CPC ........... *B01D 29/843* (2013.01); *C11B 3/008* (2013.01); *C11B 3/10* (2013.01); *B01D 36/00* (2013.01); *B01D 2201/202* (2013.01); *B01D 2201/30* (2013.01)

(56) References Cited

U.S. PATENT DOCUMENTS

| | | | | |
|---|---|---|---|---|
| 1,754,599 A * | 4/1930 | Bollmann | ............. | C11B 3/10 210/519 |
| 2,083,578 A * | 6/1937 | Roberts | ............. | C10G 73/025 210/772 |
| 2,301,430 A * | 11/1942 | Malanowski | .......... | B01D 29/52 210/497.1 |
| 2,423,172 A * | 7/1947 | Booth | .............. | B01D 29/33 210/411 |
| 2,468,603 A * | 4/1949 | Pew | .................. | B01D 29/114 210/323.2 |
| 2,475,561 A * | 7/1949 | Cooperider et al. | ... | B01D 33/21 210/324 |
| 2,540,362 A * | 2/1951 | Hammond | .......... | B01D 29/395 210/306 |
| 2,547,277 A * | 4/1951 | Short | ................ | B01D 29/90 210/259 |
| 2,562,699 A * | 7/1951 | Cooperson | .......... | B01D 37/02 210/411 |
| 2,569,124 A * | 9/1951 | Christenson | ......... | C11B 3/001 554/191 |
| 2,570,132 A * | 10/1951 | Koupal | ............. | B01D 29/114 210/323.1 |
| 2,693,882 A * | 11/1954 | Ebert | ................. | B01D 29/52 210/345 |
| 2,697,523 A * | 12/1954 | Bloksma | ............ | B01D 46/48 210/166 |
| 2,710,099 A * | 6/1955 | Kalinske | ............ | B01D 29/52 210/323.2 |
| 2,731,107 A * | 1/1956 | Hersey, Jr. | ........... | B01D 29/15 55/284 |
| 2,780,363 A * | 2/1957 | Pew | ................... | B01D 29/66 210/411 |
| 2,784,846 A * | 3/1957 | Ebert | ................. | B01D 29/52 210/456 |
| 2,819,800 A * | 1/1958 | Goodloe | ............. | B01D 25/00 210/488 |
| 2,848,112 A * | 8/1958 | Hass | .................. | B01D 29/66 210/333.01 |
| 2,862,622 A * | 12/1958 | Jones | ................. | B01D 29/66 210/411 |
| 2,872,044 A * | 2/1959 | Kasten | .............. | B01D 25/00 210/488 |
| 2,874,848 A * | 2/1959 | Cannon | ............. | B01D 29/72 55/300 |
| 2,901,115 A * | 8/1959 | Ledford | ............. | B01D 35/16 210/785 |
| 2,909,285 A * | 10/1959 | Besler | .............. | B01D 29/94 210/330 |
| 2,912,110 A * | 11/1959 | Stoltenberg | ......... | B01D 25/164 210/90 |
| 2,981,416 A * | 4/1961 | Lawlor | .............. | B01D 29/15 210/411 |
| 3,003,894 A * | 10/1961 | Fredrickson | ......... | C08B 30/18 127/23 |
| 3,034,652 A * | 5/1962 | Hobson, Jr. | .......... | B01D 29/52 210/232 |
| 3,042,214 A * | 7/1962 | Arvanitakis | .......... | B01D 35/16 210/330 |
| 3,055,290 A * | 9/1962 | Arvanitakis | ....... | B01D 33/0183 210/407 |
| 3,100,190 A * | 8/1963 | Hobson, Jr. | .......... | B01D 29/52 210/497.1 |
| 3,155,613 A * | 11/1964 | Felix | ................ | B01D 29/66 210/232 |
| 3,169,109 A * | 2/1965 | Hirs | .................. | B01D 35/12 210/138 |
| 3,204,766 A * | 9/1965 | Schmidt, Jr. | ......... | B01D 29/606 210/90 |
| 3,212,643 A * | 10/1965 | Zievers | ............. | B01D 29/39 55/300 |
| 3,225,933 A * | 12/1965 | Berline | ............. | B01D 29/15 40/518 |
| 3,231,390 A * | 1/1966 | Hoover | .............. | C11B 3/10 554/192 |
| 3,233,734 A * | 2/1966 | Muller | .............. | B01D 29/416 210/216 |
| 3,251,469 A * | 5/1966 | Muller | .............. | B01D 29/41 210/197 |
| 3,262,568 A * | 7/1966 | Zehrbach | ........... | B01D 29/114 210/138 |
| 3,280,978 A * | 10/1966 | Scott | ................ | B01D 35/16 210/408 |
| 3,310,175 A * | 3/1967 | McLagan | ............ | B01D 37/02 55/296 |
| 3,312,352 A * | 4/1967 | Shiells | .............. | B01D 29/114 210/323.2 |
| 3,356,215 A * | 12/1967 | Miles, Jr. | ............. | B01D 29/52 210/333.1 |
| 3,360,869 A * | 1/1968 | Muller | .............. | B01D 29/843 210/771 |
| 3,394,815 A * | 7/1968 | Harms | ............... | B01D 29/52 210/457 |
| 3,399,777 A * | 9/1968 | Passalaqua | ............ | B01D 35/20 210/486 |
| 3,407,572 A * | 10/1968 | Tolley | ............... | B01D 46/76 55/299 |
| 3,416,669 A * | 12/1968 | Hubbard | ............. | B01D 29/668 210/411 |
| 3,422,958 A * | 1/1969 | Newman | ............ | B01D 35/16 210/457 |
| 3,438,502 A * | 4/1969 | Borre | ................ | B01D 29/19 210/232 |
| 3,447,690 A * | 6/1969 | Kracklauer | ........ | B01D 29/6484 55/299 |
| 3,482,700 A * | 12/1969 | Bebech | .............. | B01D 29/72 210/407 |
| 3,497,452 A * | 2/1970 | Arvanitakis | .......... | B01D 33/37 210/663 |
| 3,556,304 A * | 1/1971 | Collard | .............. | B01D 29/52 210/489 |
| 3,623,910 A * | 11/1971 | Calhoun | ............. | B01D 46/70 96/228 |
| 3,633,753 A * | 1/1972 | Petitjean | ............. | B01D 29/66 55/288 |
| 3,637,079 A * | 1/1972 | Strub | ................ | B01D 29/94 210/794 |
| 3,642,141 A * | 2/1972 | Hobson, Jr. | .......... | B01D 29/15 210/457 |
| 3,662,013 A * | 5/1972 | Machell et al. | .......... | C07C 7/14 585/816 |
| 3,666,097 A * | 5/1972 | Ryan | ................ | B01D 29/661 210/333.01 |
| 3,673,228 A * | 6/1972 | Harris | .............. | C11B 3/10 554/191 |
| 3,679,052 A * | 7/1972 | Asper | ............... | B01D 21/02 210/411 |
| 3,682,306 A * | 8/1972 | Gaudfrin | ............ | B01D 33/37 210/333.1 |
| 3,715,033 A * | 2/1973 | Soriente | ............. | B01D 29/15 210/338 |
| 3,736,641 A * | 6/1973 | Fosdick | ............. | B21C 37/124 29/896.62 |

(56) References Cited

U.S. PATENT DOCUMENTS

| | | | | |
|---|---|---|---|---|
| 3,744,633 A * | 7/1973 | Schmidt, Jr. | B01D 29/94 | 210/785 |
| 3,765,152 A * | 10/1973 | Pausch | B01D 46/4281 | 95/279 |
| 3,796,316 A * | 3/1974 | Matz | B01D 29/52 | 100/116 |
| 3,857,866 A * | 12/1974 | Gibble | C11B 3/001 | 554/191 |
| 3,891,551 A * | 6/1975 | Tiedemann | B01D 29/661 | 210/323.1 |
| 3,970,564 A * | 7/1976 | Shamsutdinov | B01D 29/41 | 210/791 |
| 3,984,447 A * | 10/1976 | Cooper | C11B 3/001 | 210/167.28 |
| 4,085,050 A * | 4/1978 | Gervasi | B01D 29/52 | 210/414 |
| 4,089,781 A * | 5/1978 | Asp | B01D 29/52 | 210/411 |
| 4,094,784 A * | 6/1978 | Hirano | B01D 33/52 | 210/780 |
| 4,111,814 A * | 9/1978 | Knigge | B01D 29/23 | 196/127 |
| 4,141,128 A * | 2/1979 | Wonderling | B23P 15/00 | 55/379 |
| 4,153,552 A * | 5/1979 | Muther | B01D 37/02 | 210/427 |
| 4,157,900 A * | 6/1979 | Margraf | B01D 46/0005 | 55/379 |
| 4,163,724 A * | 8/1979 | Muller | B01D 29/52 | 210/334 |
| 4,210,537 A * | 7/1980 | Butterworth | B01D 29/114 | 210/323.2 |
| 4,213,861 A * | 7/1980 | Muller | B01D 29/114 | 210/797 |
| 4,217,700 A * | 8/1980 | Muller | B01D 29/114 | 210/771 |
| 4,230,630 A * | 10/1980 | Mag | C11B 3/10 | 210/219 |
| 4,243,533 A * | 1/1981 | Savolainen | B01D 29/11 | 210/309 |
| 4,246,114 A * | 1/1981 | Krebs | C02F 3/1242 | 210/220 |
| 4,259,095 A * | 3/1981 | Johnson, Jr. | B01D 46/71 | 55/379 |
| 4,264,345 A * | 4/1981 | Miller | B01D 50/20 | 55/504 |
| 4,264,445 A * | 4/1981 | Lumikko | B01D 29/54 | 210/323.2 |
| 4,265,771 A * | 5/1981 | Lennartz | B01D 29/72 | 210/791 |
| 4,277,349 A * | 7/1981 | Schwinghammer | B01D 29/114 | 134/113 |
| 4,282,105 A * | 8/1981 | Crowe | B01D 29/908 | 210/108 |
| 4,289,630 A * | 9/1981 | Schmidt, Jr. | B01D 29/843 | 55/300 |
| 4,290,790 A * | 9/1981 | Okubo | B01D 46/06 | 55/379 |
| 4,292,180 A * | 9/1981 | Zylka | B01D 29/111 | 210/497.01 |
| 4,293,414 A * | 10/1981 | Gianneli | B01D 37/02 | 210/323.2 |
| 4,297,115 A * | 10/1981 | Johnson, Jr. | B01D 46/0043 | 55/379 |
| 4,324,571 A * | 4/1982 | Johnson, Jr. | B01D 46/0041 | 55/379 |
| 4,340,477 A * | 7/1982 | Hobson, Jr. | B01D 29/66 | 210/241 |
| 4,344,781 A * | 8/1982 | Higgins | B01D 46/026 | 55/379 |
| 4,388,197 A * | 6/1983 | Lumikko | B01D 29/114 | 162/189 |
| 4,405,466 A * | 9/1983 | Giannelli | B01D 29/114 | 210/411 |
| 4,436,633 A * | 3/1984 | Robinsky | B01D 29/44 | 210/791 |
| 4,439,327 A * | 3/1984 | Muller | B01D 29/92 | 210/791 |
| 4,446,030 A * | 5/1984 | Schmidt, Jr. | B01D 29/52 | 210/120 |
| 4,511,471 A * | 4/1985 | Muller | B01D 29/92 | 210/333.1 |
| 4,517,086 A * | 5/1985 | Romey | B01D 29/72 | 210/334 |
| 4,525,274 A * | 6/1985 | Willus | B01D 35/30 | 210/333.1 |
| 4,526,688 A * | 7/1985 | Schmidt, Jr. | B01D 29/15 | 210/489 |
| 4,528,103 A * | 7/1985 | Spilkin | B01D 29/52 | 210/779 |
| 4,547,296 A * | 10/1985 | Sim | B01D 29/114 | 210/323.2 |
| 4,552,669 A * | 11/1985 | Sekellick | B01D 36/001 | 210/323.2 |
| 4,560,483 A * | 12/1985 | Warning | B01D 29/668 | 210/489 |
| 4,578,197 A * | 3/1986 | Muller | B01D 29/114 | 210/333.1 |
| 4,591,446 A * | 5/1986 | Muller | B01D 29/90 | 261/76 |
| 4,592,847 A * | 6/1986 | Schumacher | B01D 29/94 | 210/186 |
| 4,604,201 A * | 8/1986 | Muller | B01D 29/15 | 210/323.2 |
| 4,609,462 A * | 9/1986 | Flynn | B01D 29/52 | 210/232 |
| 4,623,489 A * | 11/1986 | Rivers, Jr. | C11B 3/04 | 554/189 |
| 4,704,210 A * | 11/1987 | Boze | B01D 35/12 | 210/497.1 |
| 4,713,174 A * | 12/1987 | Zievers | B01D 29/52 | 55/379 |
| 4,725,356 A * | 2/1988 | Zievers | B01D 29/52 | 210/450 |
| 4,728,423 A * | 3/1988 | Kuwajima | B01D 29/114 | 210/438 |
| 4,731,100 A * | 3/1988 | Loeffelmann | B01D 46/69 | 95/286 |
| 4,744,896 A * | 5/1988 | James | B01D 29/15 | 210/170.07 |
| RE32,695 E * | 6/1988 | Nahra | A23C 3/0375 | 261/129 |
| 4,759,835 A * | 7/1988 | Klinkowski | B01D 29/661 | 204/520 |
| 4,789,474 A * | 12/1988 | Gaudfrin | B01D 35/147 | 210/411 |
| 4,804,481 A * | 2/1989 | Lennartz | B01D 29/52 | 210/791 |
| 4,816,189 A * | 3/1989 | Rothbart | C11B 3/001 | 554/198 |
| 4,830,747 A * | 5/1989 | Kubota | B01D 29/48 | 134/22.12 |
| 4,834,883 A * | 5/1989 | Lake | B01D 29/52 | 210/409 |
| 4,836,936 A * | 6/1989 | Schewitz | B01D 29/39 | 210/791 |
| 4,861,498 A * | 8/1989 | Robinsky | B01D 29/663 | 210/791 |
| 4,865,627 A * | 9/1989 | Dewitz | B01D 46/46 | 95/286 |
| 4,872,981 A * | 10/1989 | Hobson, Jr. | B01D 29/90 | 210/420 |
| 4,876,006 A * | 10/1989 | Ohkubo | B01D 65/02 | 210/321.89 |
| 4,913,922 A * | 4/1990 | Hawkes | C11B 3/008 | 426/429 |

(56) References Cited

U.S. PATENT DOCUMENTS

| | | | | |
|---|---|---|---|---|
| 4,919,801 | A * | 4/1990 | Hobson, Jr. | B01D 29/114 210/388 |
| 4,943,379 | A * | 7/1990 | Boze | B01D 29/843 210/411 |
| 4,944,887 | A * | 7/1990 | Frederick | B01D 29/70 210/791 |
| 4,952,317 | A * | 8/1990 | Culkin | B01D 63/16 210/636 |
| 4,957,625 | A * | 9/1990 | Katoh | B01D 29/605 210/123 |
| 4,963,271 | A * | 10/1990 | Raehse | B01D 29/52 210/772 |
| 5,004,860 | A * | 4/1991 | Hansen | B01D 29/606 585/815 |
| 5,017,241 | A * | 5/1991 | Ryan | B01D 29/52 210/791 |
| 5,045,200 | A * | 9/1991 | Brook | A47J 37/1223 426/417 |
| 5,049,264 | A * | 9/1991 | Rosnack | A23L 5/11 210/DIG. 8 |
| 5,061,303 | A * | 10/1991 | Williams | B01D 46/02 55/379 |
| 5,062,965 | A * | 11/1991 | Bernou | B01D 29/72 210/785 |
| 5,062,968 | A * | 11/1991 | Warning | B01D 29/668 210/93 |
| 5,085,997 | A * | 2/1992 | Muller | C12M 33/14 210/791 |
| 5,114,596 | A * | 5/1992 | Laterra | B01D 29/114 134/22.12 |
| 5,128,038 | A * | 7/1992 | Slavitschek | B01D 29/114 376/313 |
| 5,149,449 | A * | 9/1992 | Strid | B01D 29/66 210/411 |
| 5,152,815 | A * | 10/1992 | Zievers | B01D 46/58 55/374 |
| 5,160,428 | A * | 11/1992 | Kuri | B01D 29/60 210/111 |
| 5,173,098 | A * | 12/1992 | Pipkorn | B01D 46/06 55/379 |
| 5,227,076 | A * | 7/1993 | Bogen | B01D 35/303 210/791 |
| 5,228,921 | A * | 7/1993 | Peterson | A62D 3/34 134/25.1 |
| 5,230,131 | A * | 7/1993 | Hobson, Jr. | B01D 29/96 29/402.06 |
| 5,234,504 | A * | 8/1993 | Peterson | A62D 3/34 134/25.1 |
| 5,296,134 | A * | 3/1994 | Zaiter | B01D 29/66 55/482 |
| 5,346,629 | A * | 9/1994 | Wuller | B01D 36/04 210/791 |
| 5,358,552 | A * | 10/1994 | Seibert | B01D 46/79 95/281 |
| 5,384,034 | A * | 1/1995 | Hetzel | B01D 29/52 210/418 |
| 5,397,465 | A * | 3/1995 | Stewart | B01D 29/39 210/167.13 |
| 5,407,570 | A * | 4/1995 | Hobson, Jr. | B01D 29/15 210/232 |
| 5,421,845 | A * | 6/1995 | Gregg | B01D 46/04 55/294 |
| 5,437,788 | A * | 8/1995 | Geibel | B01D 29/661 210/411 |
| 5,441,633 | A * | 8/1995 | Schewitz | B01D 29/908 210/323.2 |
| 5,470,473 | A * | 11/1995 | Park | B01D 33/60 210/402 |
| 5,494,591 | A * | 2/1996 | Stamm | B01D 29/114 210/791 |
| 5,498,349 | A * | 3/1996 | Kurahashi | B01D 29/606 210/411 |
| 5,518,609 | A * | 5/1996 | Karlsson | B01D 29/15 210/97 |
| 5,540,846 | A * | 7/1996 | Koch | B01D 33/663 134/40 |
| 5,589,079 | A * | 12/1996 | Park | B01D 33/76 210/791 |
| 5,599,376 | A * | 2/1997 | Camp | C22B 23/026 554/12 |
| 5,628,916 | A * | 5/1997 | Stevens | B01D 29/216 210/799 |
| 5,643,468 | A * | 7/1997 | Ure | B01D 33/04 210/406 |
| 5,651,896 | A * | 7/1997 | Nagl | B01D 17/02 210/114 |
| 5,707,512 | A * | 1/1998 | Koch | B01D 33/804 210/383 |
| 5,766,486 | A * | 6/1998 | Cathcart | B01D 46/70 210/791 |
| 5,785,870 | A * | 7/1998 | Davis | B01D 29/48 210/488 |
| 5,792,353 | A * | 8/1998 | Jungi | B01D 29/48 210/357 |
| 5,795,359 | A * | 8/1998 | McLeish | B01D 46/70 96/233 |
| 5,800,580 | A * | 9/1998 | Feldt | B01D 46/06 55/378 |
| 5,858,217 | A * | 1/1999 | Redl | B01D 29/52 210/414 |
| 5,951,726 | A * | 9/1999 | Allingham | B01D 46/0013 55/379 |
| 5,972,228 | A * | 10/1999 | Ingelman | B01D 35/16 210/333.1 |
| 6,051,138 | A * | 4/2000 | Hobson, Jr. | B01D 29/72 55/379 |
| 6,113,778 | A * | 9/2000 | Kemp | B01D 29/78 210/328 |
| 6,177,006 | B1 * | 1/2001 | Nagaoka | B01D 29/15 210/330 |
| 6,200,367 | B1 * | 3/2001 | Phillips | B01D 46/0086 96/417 |
| 6,217,781 | B1 * | 4/2001 | Hobson, Jr. | B01D 29/52 210/791 |
| 6,309,552 | B1 * | 10/2001 | Hobson, Jr. | B01D 29/52 210/791 |
| 6,332,977 | B1 * | 12/2001 | Janecek | B01D 37/02 210/96.1 |
| 6,341,567 | B1 * | 1/2002 | Robertson | F23G 7/05 55/482.1 |
| 6,342,158 | B1 * | 1/2002 | Wills | B01D 29/15 210/240 |
| 6,365,054 | B1 * | 4/2002 | Kruger | B01D 35/16 210/411 |
| 6,387,271 | B1 * | 5/2002 | Geibel | B01D 61/147 210/500.36 |
| 6,409,929 | B2 * | 6/2002 | Bott | B01D 35/31 210/402 |
| 6,437,211 | B2 * | 8/2002 | Kaye | A61L 11/00 210/764 |
| 6,439,273 | B1 * | 8/2002 | Kruger | B01D 29/114 141/69 |
| 6,440,188 | B1 * | 8/2002 | Clements | B01D 46/02 55/378 |
| 6,472,580 | B2 * | 10/2002 | Kaye | A61L 2/18 588/317 |
| 6,495,037 | B1 * | 12/2002 | Schuyler | B01D 29/114 210/232 |
| 6,500,347 | B2 * | 12/2002 | Ohkoshi | B01D 37/00 210/791 |
| 6,660,164 | B1 * | 12/2003 | Stover | C02F 3/006 210/194 |
| 6,676,722 | B1 * | 1/2004 | Clements | B01D 46/2407 55/378 |
| 6,680,032 | B1 * | 1/2004 | Uhlemann | B01J 8/003 422/139 |
| 6,730,221 | B2 * | 5/2004 | Bohn | C10G 2/32 208/950 |

(56) References Cited

U.S. PATENT DOCUMENTS

| | | | | |
|---|---|---|---|---|
| 6,793,809 | B2* | 9/2004 | Ingelman | B01D 33/76 210/396 |
| 6,814,878 | B2* | 11/2004 | Tully | B01J 8/0005 422/232 |
| 6,872,310 | B2* | 3/2005 | Trotzki | B01D 29/52 210/345 |
| 6,886,698 | B2* | 5/2005 | Tully | B01J 8/0005 210/477 |
| 6,959,504 | B2* | 11/2005 | Fabbri | B08B 9/0933 34/179 |
| 7,074,338 | B2* | 7/2006 | Mizuno | B01D 29/15 210/791 |
| 7,077,968 | B2* | 7/2006 | Pfeiffer | B01D 37/02 210/803 |
| 7,381,323 | B2* | 6/2008 | Umezawa | B01D 61/147 210/791 |
| 7,445,716 | B2* | 11/2008 | Quintel | B01D 29/52 210/636 |
| 7,722,767 | B2* | 5/2010 | Quintel | B01D 29/865 210/485 |
| 7,812,206 | B2* | 10/2010 | Wilsak | B01D 29/114 585/812 |
| 7,922,905 | B2* | 4/2011 | Grodecki | B01D 29/39 210/231 |
| 7,981,293 | B2* | 7/2011 | Powell | B01D 61/18 210/534 |
| 7,981,301 | B2* | 7/2011 | Powell | C02F 9/00 210/243 |
| 8,021,467 | B2* | 9/2011 | Zimmer | B01D 46/58 55/284 |
| 8,029,680 | B2* | 10/2011 | Shinoda | B01D 29/48 210/777 |
| 8,034,963 | B2* | 10/2011 | Ng | C11B 3/001 96/201 |
| 8,048,299 | B2* | 11/2011 | Quintel | B01D 37/00 210/485 |
| 8,052,879 | B2* | 11/2011 | Gross | B01D 29/72 210/791 |
| 8,066,953 | B2* | 11/2011 | Muth | B01J 19/0066 422/208 |
| 8,075,775 | B2* | 12/2011 | Grodecki | B01D 29/007 210/231 |
| 8,192,617 | B2* | 6/2012 | Powell | C02F 9/00 210/197 |
| 8,211,319 | B2* | 7/2012 | Wilsak | B01D 29/114 585/812 |
| 8,221,618 | B2* | 7/2012 | Murray | B01D 29/72 210/411 |
| 8,303,682 | B2* | 11/2012 | Nowak | B01D 46/71 95/1 |
| 8,303,688 | B2* | 11/2012 | Sharma | B01D 46/2407 210/167.04 |
| 8,309,711 | B2* | 11/2012 | Wiley | B01D 29/114 210/411 |
| 8,367,009 | B2* | 2/2013 | Nagl | C01B 17/0205 422/250.1 |
| 8,409,429 | B2* | 4/2013 | Kaske | B01D 29/94 210/411 |
| 8,425,774 | B2* | 4/2013 | Grodecki | B01D 29/007 210/231 |
| 8,470,182 | B2* | 6/2013 | Muth | B01J 19/0066 588/317 |
| 8,481,768 | B2* | 7/2013 | Sarangan | C11B 3/12 554/13 |
| 8,591,745 | B2* | 11/2013 | Merino | C02F 1/444 210/741 |
| 8,597,375 | B2* | 12/2013 | Nagl | B01J 19/0063 23/308 S |
| 8,764,975 | B2* | 7/2014 | Salmisuo | A61L 11/00 422/26 |
| 8,888,881 | B2* | 11/2014 | Appelo | B01D 46/02 55/374 |
| 8,962,906 | B2* | 2/2015 | Wilsak | B01D 29/52 585/812 |
| 9,108,872 | B2* | 8/2015 | Salmisuo | B09B 3/45 |
| 9,127,896 | B1* | 9/2015 | Nehlen, III | B01D 35/18 |
| 9,149,742 | B1* | 10/2015 | Nehlen, III | B01D 35/18 |
| 9,248,455 | B2* | 2/2016 | Teduka | B04B 7/18 |
| 9,302,205 | B1* | 4/2016 | Nehlen, III | C02F 1/685 |
| 9,303,924 | B1* | 4/2016 | Nehlen, III | F28D 7/16 |
| 9,486,722 | B2* | 11/2016 | Keyes | C07C 51/47 |
| 9,494,372 | B2* | 11/2016 | Nehlen, III | F28F 1/00 |
| 9,581,395 | B2* | 2/2017 | Nehlen, III | F28F 9/0131 |
| 9,630,130 | B2* | 4/2017 | Nehlen, III | F28F 19/01 |
| 9,782,704 | B2* | 10/2017 | Merino | B01D 29/66 |
| 10,406,458 | B1* | 9/2019 | Nehlen, III | B01D 37/02 |
| 10,543,495 | B2* | 1/2020 | Ackerman | B01D 46/58 |
| 10,758,852 | B2* | 9/2020 | Diel | B01D 36/001 |
| 10,814,255 | B1* | 10/2020 | Nehlen, III | B01D 29/17 |
| 10,814,256 | B1* | 10/2020 | Nehlen, III | B01D 37/02 |
| 10,850,216 | B1* | 12/2020 | Nehlen, III | B01D 29/15 |
| 10,981,091 | B1* | 4/2021 | Nehlen, III | B01D 29/17 |
| 11,033,914 | B2* | 6/2021 | Ackerman | B01D 1/18 |
| 11,065,566 | B2* | 7/2021 | Nehlen, III | B01D 29/906 |
| 11,148,071 | B2* | 10/2021 | Kelsey | B01D 17/045 |
| 11,167,226 | B2* | 11/2021 | Nehlen, III | B01D 37/02 |
| 11,173,430 | B2* | 11/2021 | Gaudfrin | B01D 35/16 |
| 11,471,798 | B2* | 10/2022 | Vallejo | B01D 29/6438 |
| 11,559,757 | B2* | 1/2023 | Ruzicka | B01D 35/30 |
| 2001/0003330 | A1* | 6/2001 | Bott | B01D 33/60 210/402 |
| 2002/0006769 | A1* | 1/2002 | Tsuihiji | B01D 69/14 451/87 |
| 2002/0104297 | A1* | 8/2002 | Pipkorn | B01D 46/02 55/379 |
| 2003/0196951 | A1* | 10/2003 | Tully | B01J 8/006 210/511 |
| 2004/0026312 | A1* | 2/2004 | Tully | B01J 8/08 210/488 |
| 2004/0094038 | A1* | 5/2004 | Hahn | B01D 29/48 99/277 |
| 2004/0134170 | A1* | 7/2004 | Pipkorn | B01D 46/0093 55/379 |
| 2004/0262209 | A1* | 12/2004 | Umezawa | B01D 29/66 210/216 |
| 2005/0034436 | A1* | 2/2005 | Pipkorn | B01D 46/06 55/379 |
| 2005/0056599 | A1* | 3/2005 | Wilsak | B01D 29/114 210/767 |
| 2005/0189303 | A1* | 9/2005 | Kaeske | B03C 1/08 210/774 |
| 2005/0218058 | A1* | 10/2005 | Tully | B01J 8/006 210/241 |
| 2006/0266685 | A1* | 11/2006 | Umezawa | B01D 37/02 210/216 |
| 2006/0266686 | A1* | 11/2006 | Umezawa | B01D 29/39 210/216 |
| 2006/0266687 | A1* | 11/2006 | Umezawa | B01D 37/02 210/216 |
| 2007/0095743 | A1* | 5/2007 | Grodecki | B01D 29/39 210/486 |
| 2007/0225539 | A1* | 9/2007 | Wilsak | B01D 9/00 585/812 |
| 2008/0237152 | A1* | 10/2008 | Benachenhou | B01D 17/10 210/442 |
| 2008/0269513 | A1* | 10/2008 | Sarangan | C11B 13/00 554/13 |
| 2009/0045128 | A1* | 2/2009 | Murray | B01D 29/114 210/340 |
| 2009/0045149 | A1* | 2/2009 | Murray | B01D 29/72 210/393 |
| 2009/0050536 | A1* | 2/2009 | Ng | C11B 3/14 422/187 |
| 2009/0050581 | A1* | 2/2009 | Kaske | B01D 29/66 210/313 |
| 2009/0101601 | A1* | 4/2009 | Kaske | B01D 29/908 210/411 |
| 2010/0032372 | A1* | 2/2010 | Adam | B01D 37/02 210/660 |

(56) References Cited

U.S. PATENT DOCUMENTS

| | | | |
|---|---|---|---|
| 2010/0233335 A1* | 9/2010 | Jalalpoor | C11B 3/001 210/201 |
| 2011/0006008 A1* | 1/2011 | Wilsak | B01D 9/00 210/663 |
| 2011/0031192 A1* | 2/2011 | Wiley | B01D 29/52 210/209 |
| 2011/0142747 A1* | 6/2011 | Nagl | B01D 19/0063 422/106 |
| 2011/0174715 A1* | 7/2011 | Grodecki | B01D 29/007 210/236 |
| 2011/0277428 A1* | 11/2011 | Harris | B01D 46/06 55/378 |
| 2012/0267323 A1* | 10/2012 | Salmisuo | C02F 11/128 210/772 |
| 2013/0186839 A1* | 7/2013 | Nagl | B01D 17/0214 210/741 |
| 2014/0251923 A1* | 9/2014 | Salmisuo | A61L 11/00 210/768 |
| 2015/0182890 A1* | 7/2015 | Keyes | B01D 33/60 210/772 |
| 2015/0196182 A1* | 7/2015 | Hekman | A47L 11/4044 210/97 |
| 2015/0299583 A1* | 10/2015 | Kelsey | C10G 33/06 210/799 |
| 2016/0101992 A1* | 4/2016 | Nehlen, III | B01D 29/56 250/435 |
| 2016/0102924 A1* | 4/2016 | Nehlen, III | B01D 29/00 165/170 |
| 2016/0166958 A1* | 6/2016 | Nehlen, III | B01D 29/56 250/435 |
| 2016/0169597 A1* | 6/2016 | Nehlen, III | B01D 1/00 165/166 |
| 2016/0216049 A1* | 7/2016 | Nehlen, III | B01D 1/00 |
| 2017/0043278 A1* | 2/2017 | Kelsey | C10G 33/06 |
| 2017/0050125 A1* | 2/2017 | Nehlen, III | C02F 1/685 |
| 2017/0072344 A1* | 3/2017 | Powell | B08B 7/02 |
| 2019/0291028 A1* | 9/2019 | Nehlen, III | B01D 29/17 |
| 2020/0384387 A1* | 12/2020 | Nehlen, III | B01D 29/52 |
| 2021/0039023 A1* | 2/2021 | Nehlen, III | B01D 29/17 |
| 2021/0052996 A1* | 2/2021 | Nehlen, III | B01D 29/52 |
| 2021/0086111 A1* | 3/2021 | Nehlen, III | B01D 37/02 |
| 2021/0229006 A1* | 7/2021 | Nehlen, III | B01D 29/90 |
| 2021/0245078 A1* | 8/2021 | Maiworm | C11B 3/10 |
| 2021/0268409 A1* | 9/2021 | Ruzicka | B01D 29/15 |
| 2021/0331098 A1* | 10/2021 | Nehlen, III | B01D 24/047 |
| 2021/0346824 A1* | 11/2021 | Curley | B01D 24/16 |
| 2021/0362084 A1* | 11/2021 | Manoel | B01D 29/39 |
| 2022/0016552 A1* | 1/2022 | Mania | C02F 11/122 |
| 2022/0062802 A1* | 3/2022 | Nehlen, III | B01D 36/001 |
| 2022/0143534 A1* | 5/2022 | Vallejo | B01D 29/05 |
| 2022/0212121 A1* | 7/2022 | Liu | B01D 29/15 |
| 2023/0001335 A1* | 1/2023 | Powell | B01D 41/04 |

FOREIGN PATENT DOCUMENTS

| | | | |
|---|---|---|---|
| GB | 2300576 A | * 11/1996 | B01D 33/015 |
| WO | WO-2004052498 A2 | 6/2004 | |
| WO | WO-2019241248 A1 | * 12/2019 | A23D 9/04 |

OTHER PUBLICATIONS

"International Application Serial No. PCT/US2019/036553, Written Opinion dated Sep. 4, 2019", 8 pgs.

Taylor, Dennis, "Chapter 7: Bleaching", Bailey's Industrial Oil and Fat Products, Sixth Edition, vol. 5, John Wiley & Sons, (2005), 55 pgs.

* cited by examiner

PRIOR ART

LIQUID DISCHARGE FILTER AND ITS USE

CROSS-REFERENCE TO RELATED APPLICATIONS

This application is a U.S. National Stage Filing under 35 U.S.C. 371 from International Application No. PCT/US2019/036553, filed Jun. 11, 2019 and published as WO 2019/241218 on Dec. 19, 2019, which application claims the benefit of European Patent Application 18177486.0, filed Jun. 13, 2018, which are hereby incorporated by reference in their entirety.

FIELD OF THE INVENTION

A filter system and filtration process for obtaining and subsequently slurrifying a filter cake and whereby the filter cake is slurrified under such conditions that the solids of the slurrified filter cake maintain a suitable quality for being re-used.

BACKGROUND OF THE INVENTION

When separating substances it is important to choose the most appropriate separation technique. In fact, insoluble solids can be separated from liquids in several different ways. The technique will depend upon how well the substances are mixed together. A common technique is filtration whereby a filter unit is applied to trap the insoluble solids and the liquid is passed through the filter. It is easily understood that it is hard and difficult to press all the liquid from the insoluble substance and furthermore, if the insoluble substances are acting as an adsorbent, the cleaning and/or re-use of the insoluble solids will have a significant impact on the suitability of the selected adsorbent and the selected filtration technique.

Commonly applicable in the art are filter systems wherein the solids are separated from the liquid and a dried filter cake is discharged from the filter.

U.S. Pat. No. 3,637,079 describes a filter apparatus and a method for cleaning a filter with cleaning liquid.

A more specific example that is applying the separation technique of insoluble solids and liquid is the bleaching step in the refining process of edible oils.

Commonly, the bleaching step is applying an adsorbent which after the bleaching of the edible oil is discharged as a dried filter cake or slurrified with water in a separate agitation vessel and further treated as waste material.

There is still a need for a system that is not space demanding and that in its set-up allows maintaining suitable quality of the insoluble solids for example for re-use as adsorbent material.

The current invention provides such a system, its use and a filtration process.

SUMMARY OF THE INVENTION

The current invention relates to a filter system with a housing (1) for obtaining a filtered liquid and slurrifying a filter cake and the housing (1) is comprising an aperture (6) for liquid-containing-solids, and a discharge outlet (5) suitable for discharging a slurry, and characterized in that
  a) the housing (1) of the filter system is comprising a slurrification section (3) and at least one filter element (2) having two sides wherein one side is suitable for building up a filter cake and another side is suitable for contact with filtered liquid, and
  b) the slurrification section (3) is comprising the discharge outlet (5), the aperture (6), at least one nozzle (4) for steam or gas injection, and, optionally, an aperture (9) that is able to regulate the quantity of a slurrifying liquid in the slurrification section (3).

It further relates to a filtration process for obtaining a filtered liquid and slurrifying a filter cake, and the process is comprising the following steps:
  a) Bringing a liquid-containing-solids into a filter system according to the invention,
  b) separating the liquid-containing-solids into a filtered liquid and a filter cake containing the solids,
  c) collecting the filtered liquid, and
  d) providing through the aperture (6) and/or, optionally, aperture (9) a slurrifying liquid in the slurrification section (3),
  e) dropping the in step b) formed filter cake into the slurrification section (3) that is containing the slurrifying liquid from step d),
  f) making in the slurrification section (3) a slurry of the filter cake with the slurrifying liquid, and
  g) discharging the slurry from the slurrification section (3).

Furthermore, it relates to use of the filter system of the present invention to make a re-usable slurry of a filter cake.

DETAILED DESCRIPTION

Figure 1:
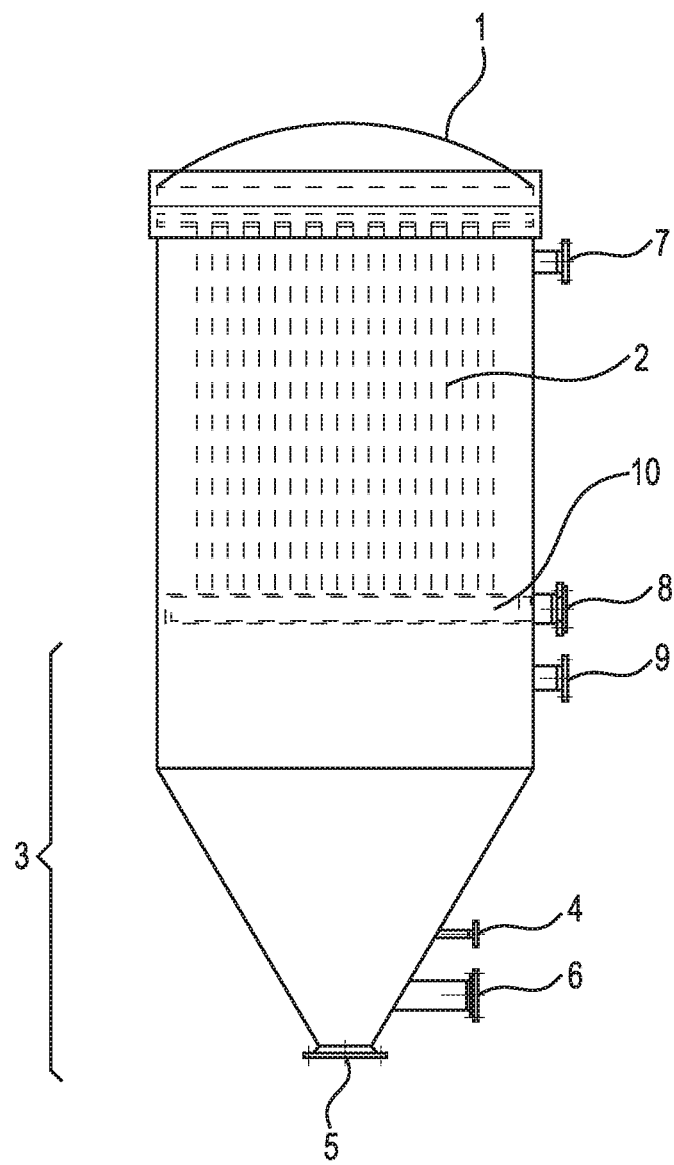
FIG. 1: is one example of the filter system in accordance with the teachings of the present invention:
  (1)=housing of the filter system;
  (2)=at least one filter element; (multiple filter elements are shown)
  (3)=slurrification section;
  (4)=nozzle for steam or gas injection;
  (5)=discharge outlet for slurry;
  (6)=aperture for liquid-containing-solids
  (7)=vacuum connection and/or at least one inlet for steam or gas, to dry filter cake, preferable a nozzle
  (8)=discharge outlet of filtered liquid,
  (9)=aperture that is able to regulate and fine-tune the quantity of slurrifying liquid in the slurrification section.
  (10)=connection between the at least one filter element (2) and the discharge outlet (8)

The current invention relates to a filter system with a housing (1) for obtaining a filtered liquid and slurrifying a filter cake and the housing (1) is comprising an aperture (6) for liquid-containing-solids, and a discharge outlet (5) suitable for discharging a slurry, and characterized in that
  a) the housing (1) of the filter system is comprising a slurrification section (3) and at least one filter element (2) having two sides wherein one side is suitable for building up a filter cake and another side is suitable for contact with filtered liquid, and b) the slurrification section (3) is comprising the discharge outlet (5), the aperture (6), at least one nozzle (4) for steam or gas injection, and, optionally, an aperture (9) that is able to regulate the quantity of a slurrifying liquid in the slurrification section (3).

In one aspect of the invention the filter system has a housing (1) for obtaining a filtered liquid and slurrifying a filter cake and the housing (1) is comprising an aperture (6) for liquid-containing-solids, and a discharge outlet (5) suitable for discharging a slurry, and characterized in that
a) the housing (1) of the filter system is comprising a slurrification section (3) and at least one filter element (2) having two sides wherein one side is suitable for building up a filter cake and another side is suitable for contact with filtered liquid, and
b) the slurrification section (3) is comprising the discharge outlet (5), the aperture (6), at least one nozzle (4) for steam or gas injection, and, optionally, an aperture (9) that is able to regulate the quantity of a slurrifying liquid in the slurrification section (3), and
wherein the at least one filter element (2), has no connection with a vessel for input of a liquid under pressure into the side of the at least one filter element (2) which is suitable for contact with filtered liquid.

The filter system of the present invention is such that the housing (1) is comprising a slurrification section (3) and at least one filter element (2) (see FIG. 1). In one aspect of the invention the housing (1) is comprising more than one filter element (2).

The filter element (2) is having two sides wherein one side is suitable for building up a filter cake and another side is suitable for contact with filtered liquid. When the filter system is in operation, a separation will take place at the level of the at least one filter element (2). The solids from a liquid-containing-solids will build up on one side of the at least one filter element (2) (is the filter cake side). The liquid from the liquid-containing-solids will be able to pass through the filter element (2). The other side of the at least filter element (2) is suitable for contact with the filtered liquid (is the filtered liquid side).

In one aspect of the invention the at least one filter element (2) has no connection with a vessel for input of a liquid under pressure into the side which is suitable for contact with filtered liquid. The side of the at least one filter element (2) which is suitable for contact with filtered liquid does not have a means to displace under pressure a liquid from a vessel. The side of the at least one filter element (2) which is suitable for contact with the filtered liquid does not have a means to displace under pressure a cleaning liquid from a vessel connected to this side into the other side of the at least one filter element (2) where the filter cake, or the remaining of the filter cake, is located.

The filter system of the present invention allows that the slurrification of the filter cake is taking place in the same housing (1). The presence of the at least one nozzle (4) in the slurrification section (3) allows amongst others that the slurrification takes place in the same housing (1). There is no need for a specific discharge outlet between the slurrification section (3) and the side of at least one filter element (2) which is suitable for building up the filter cake. There is no need for specific connection valves and the like. There is no need for an extra agitation vessel for the slurrification of the filter cake. The current filter system has less space requirements. It is further more easy to operate the filter system under reduced oxygen content, compared to oxygen content in atmosphere, preferably to operate the filter system oxygen free.

A nozzle such as the at least one nozzle (4) is a projecting spout, terminal discharging pipe, or the like designed to control the characteristics or direction of flow of a jet of steam or gas. It further improves the velocity of the gas as it enters into the filter system.

The at least one nozzle (4) in the slurrification section (3) is suitable for steam or gas (such as nitrogen gas) injection. The injection of steam or gas allows amongst others for the slurrification of the filter cake with a slurrifying liquid, and facilitates the agitation of the thus formed slurry. The slurrification section (3) is comprising more than one nozzle (4).

The at least one filter element (2) may be a plate filter element, a leaf filter element or a pulse tube filter element, a candle filter element or any type of filter element that can be operated under reduced oxygen content compared to oxygen content in atmosphere, preferably oxygen free. It can be operated in a discontinuous, or batch-wise process. Preferably the at least one filter element (2) is a plate filter element or leaf filter element. More preferably the at least one filter element (2) is a vertical leaf filter element. The filter system is operated under reduced oxygen content compared to oxygen content in atmosphere, preferably oxygen free. It can be operated under vacuum or under nitrogen gas.

A pulse tube filter has a general arrangement of an outer cylinder with an inner candle filter. It is developed to have a minimum of losses of liquid in the filter cake. It allows for pressures up to 150 bars, to remove as much as possible the liquid from the filter cake.

A candle filter is a filter comprising a number of filter elements, candles, housed in a pressure vessel. Filtration is out-to-in, with the elements themselves formed from a support covered with a tubular filter cloth. The candles are suspended vertically in the filtering system to allow for cake discharge into the slurrification section.

Further implementations of the pressure-vessel-housed-filters concept include leaf, plate and disc filters. These units incorporate flat filter elements, arranged in pressure housings and the filter element may be horizontal or vertical.

The leaf filter is a filter well-known in the art and it incorporates an array of leafs (filter elements), with filter media on both sides of the element, each one parallel to its neighbors and hanging equally spaced. The filter element may incorporate a sheet of wire mesh, or a filter cloth supported on a coarse wire mesh or similar strong substrate. The filter cake builds up on the surface of the leaves. An alternative arrangement has the leaves hanging vertically in a vessel that is also oriented vertically. The leaves may vary in size.

A disc plate filter is an alternative type of filter wherein the filter elements, usually circular elements, discs, are placed horizontally in the filtering system. As with leaf filters, the at least one filter element is operated batch-wise.

A filter that combines features of leaf and plate is the dual plate filter in which the filter elements are two-sided filtering on top and bottom, giving a large filtration area.

The actual set-up of the at least one filter element (2) is based upon existing set-ups known in the art for pressure filter vessels. Preferably the at least one filter element (2) is a vertical leaf filter element. Preferably the filter system of the present invention is comprising more than one vertical leaf filter element. The current invention is aiming at a filter system wherein the slurrification of the filter cake is happening in the same housing (1) wherein also the filtration is taking place in such a way that the quality of solids of the slurrified filter cake is maintained, and is suitable for re-use of these solids in a process step prior to the filtration process. Without being bound by extensive explanations, it is to be noted that the one housing (1) of the filter system, comprising the slurrification section (3) and the at least one filter element (2) allows the in-situ slurrification of the filter cake and avoids amongst others the following features: use of several valves, a large discharging valve for dry filter cake, a separate slurrification tank with agitator. Such a separate slurrification tank takes up more space and is more difficult to avoid contact with oxygen which has a negative impact on the quality of the filter cake.

Figure 2:
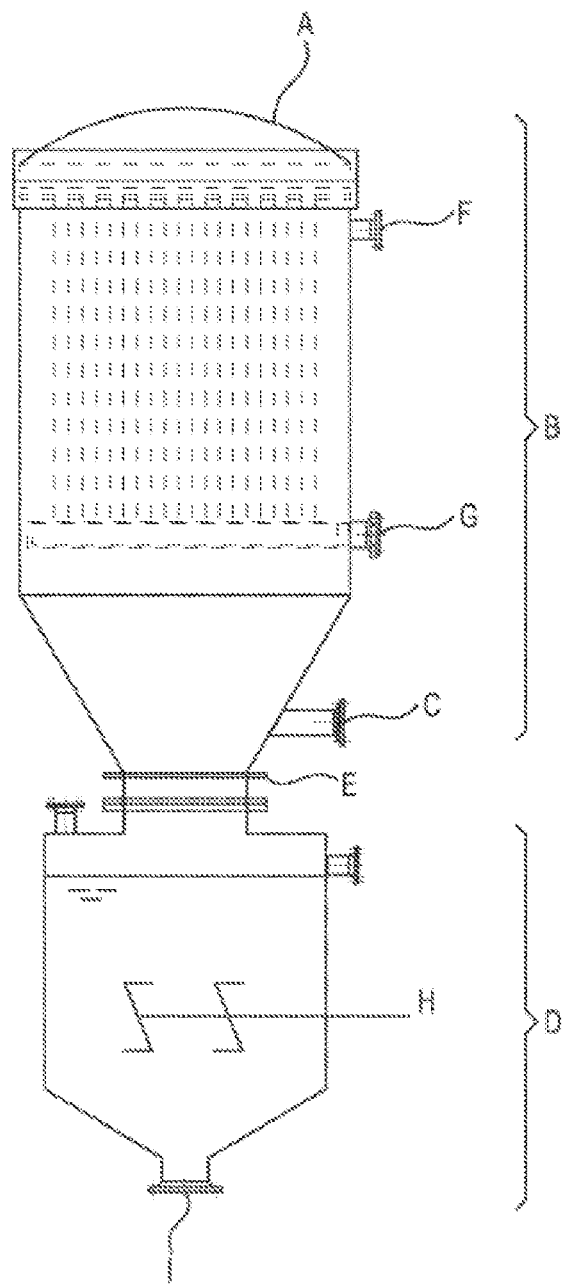
FIG. 2: is an example of an existing filter system and an agitation vessel. (not part of the invention)
  (A)=(B) the housing of the filter system
  (C)=inlet/outlet for liquid containing solids;
  (D)=separate agitation vessel for slurrification;
  (E)=discharge outlet suitable for dry filter cake;
  (F)=venting nozzle to dry the filter cake
  (G)=discharge of filtered liquid
  (H)=agitator;
  (I)=discharge outlet for slurry.

The filter system existing in the art (FIG. 2), consists of a housing that is only containing filter elements. It is not containing a slurrification section. The housing (A) of the existing filter systems is exclusively used for filtering purposes. It is not used to prepare a slurry of the filter cake with slurrifying liquid. The housing (A) of these existing systems do not allow for slurrification of the filter cake. The formed filter cake is dried and is discharged as dry filter cake from the filter system into a separate vessel (D) that is connected to the filter system and that is equipped with an agitator. The further slurrification of the dry filter cake is happening in a separate agitation vessel (D) that is extending the housing of the filter system.

After drying and detaching the filter cake from the filter elements, it is discharged from the housing (A), in the form of large lumps, and there is a risk that the large lumps block the discharge outlet (E). Therefore, the discharge outlet (E) of the existing filter systems needs to be large. This makes it difficult or impossible to operate the equipment under vacuum or gas and it is difficult to avoid leakage or multiple leakages of air into the system. This can lead to loss of quality of the filter cake and it will be difficult or impossible to re-use it in a further process step prior to the filtration process. The slurrification of the lumps of the filter cake in the separate vessel is far more difficult than the slurrification in the filter system of the present invention.

It has been found that the filter system of the current invention is less space-occupying. In the current invention, the housing (1) of the filter system is comprising the at least one filter element (2) and the slurrification section (3), allowing to prepare a slurry in the housing (1) and then to discharge a pumpable slurry.

The filter system of the current invention allows for a slurrification of the formed filter cake in the slurrification section (3). It allows for a more simplified discharge outlet (5) compared to the discharge outlet suitable for discharge of lumps of a dry filter cake. The discharge is facilitated in that the slurry is pumpable. The discharge outlet (5) of the filter system of the current invention is usually smaller than the discharge (E) of existing filter systems that are equipped to discharged lumps of a dry filter cake. The current filter system further provides for a reduced risk of contact with oxygen and has a positive impact on the quality of solids in the slurrified filter cake. Amongst others, the filter system of the current invention allows for a better protection against oxygen exposure. As a result, the slurry is less prone to reduction of the quality of the slurrified solids. Discharging a slurry of the filter cake allows better the re-use of the slurry in a process step prior to the filtration process. No or minor disposal of the filter cake is needed or it does not need to be wasted as a low quality material.

Furthermore, the housing (1) of the current filter system may be equipped with at least one vacuum connection and/or at least one inlet for steam or gas (7) such that the filter cake can be dried before dropping it into the slurrification section (3) of the filter system. Preferably, the drying of the filter cake in the is performed with steam.

The side of the at least one filter element (2) which is suitable for contact with filtered liquid is in connection through (10) with at least one discharge outlet for filtered liquid (8). (10) is the connection between the at least one filter element (2) and the discharge outlet (8), it may be a connection pipe. The filtered liquid may be discharged in a vessel for filtered liquid that is connected to the outlet (8).

The dropping of the filter cake from the filter elements can be performed by means of gravity and/or vibration of the filter elements and/or back-pressure. Said back-pressure is generated by gas and/or steam. Preferably the filter cake can be dropped from the filter elements by means of gravitation and/or vibration of the filter elements. More preferably the filter cake is dropped from the vertical leaf filters by vibration of the leaf filters and by gravitation.

The current filter system allows the dropping of the filter cake into the slurrification section (3) under reduced oxygen content compared to oxygen content in atmosphere, preferably oxygen free.

The slurrification section (3) is equipped with at least one aperture (6) for the liquid-containing-solids. The aperture (6) is mainly used as inlet for the liquid-containing-solids that will be filtered in the current filter system. The aperture (6) can be used as outlet when a quantity of liquid-containing-solids that may still be present in the slurrification section (3) after filtration is to be removed or reduced. Once filtration is stopped, the remaining quantity of liquid-containing-solids that is still present in the housing (1) can be removed through the aperture (6).

Preferably, the lower part of the slurrification section (3) of the filter system has a conical shape. More preferably the slurrification section (3) itself has a conical shape. The cone may have an angle of from 30 to 80 degrees, preferably 50 to 70 degrees. The slurry is potentially free to slide or flow from the broad end of the cone to the narrow end, where the discharge is taking place.

The slurrification section (3) may further be equipped with aperture (9) that is able to regulate the quantity of slurrifying liquid in the slurrification section (3). The aperture (9) can fine tune the quantity of slurrification liquid in the slurrification section (3). Preferably the aperture (9) is a nozzle and equipped for allowing fine-tuning of liquid present in the slurrification section (3), preferably the aperture (9) is equipped with a gooseneck drain. Preferably the aperture (9) is used as an outlet to discharge slurrifying liquid up to a certain level in the slurrification section (3). The quantity of liquid-containing-solids can be regulated with aperture (6) and aperture (9). The aperture (9) is equipped to fine-tune the quantity. Regulating the quantity with aperture (6) without the use of the aperture (9) will be less accurate. The presence of the gooseneck drain allows a better fine-tuning of the quantity of the slurrification liquid.

In one aspect of the invention, the slurrification section (3) is equipped with more than one nozzle (4), up to 10 nozzles per meter circumference of the slurrification section (3), preferably from 1 to 6 nozzles per meter circumference. Preferably, the nozzles are spread over the walls of the slurrification section (3) and allow agitation of the slurry in the slurrification section (3). The nozzles improve the agitation of the slurry.

Preferably the nozzles are placed lower than half of the height of the slurrification section (3).

The filter system according to the present invention may prevent that the solids of the slurrified filter cake sediment and/or stick to the bottom and/or the walls of the slurrification section (3). Once the solids sediment and get in contact with the bottom and/or the walls of the slurrification section (3), it may be very difficult to detach them again. The filter system according to the present invention provides for a good and homogeneous slurrification and/or prevents sedimentation and/or sticking of solids to the bottom and/or the walls of the slurrification section (3). Preferably, the at least one nozzle (4) is contributing to a better agitation of the slurry. The aperture (6) and more specifically the aperture (9) can regulate the quantity of liquid-containing solids in the slurrification section (3) and thus contribute to the pumpability of the slurry.

In one aspect, the slurrification section (3) of the filter system according to the invention is suitable for obtaining a re-usable slurry.

Preferably the current invention relates to the filter system with a housing (1) for obtaining a filtered liquid and slurrifying a filter cake and the housing (1) is comprising an aperture (6) for liquid-containing-solids, and a discharge outlet (5) suitable for discharging a slurry, and characterized in that:

a) the housing (1) of the filter system is comprising the slurrification section (3) and the at least one filter element (2) which is at least a vertical leaf filter element having two sides wherein one side is suitable for building up a filter cake and another side is suitable for contact with filtered liquid, and, the at least one vertical leaf filter element is connected through connection (10) with the discharge outlet (8) for filtered liquid, and b) the slurrification section (3) is comprising the discharge outlet (5), the aperture (6), the at least one nozzle (4) for steam or gas injection, and the aperture (9) that is able to regulate the quantity of a slurrifying liquid in the slurrification section (3), and wherein the at least one vertical leaf filter element has no connection with a vessel for input of a liquid under pressure into the side of the at least one vertical leaf filter element (2) which is suitable for contact with filtered liquid.

The invention further relates to a filtration process for obtaining a filtered liquid and slurrifying a filter cake, and the process is comprising the following steps:

a) Bringing a liquid-containing-solids into a filter system according to the invention, b) separating the liquid-containing-solids into a filtered liquid and a filter cake containing the solids, c) collecting the filtered liquid, and d) providing through the aperture (6) and/or, optionally, aperture (9) a slurrifying liquid in the slurrification section (3), e) dropping the in step b) formed filter cake into the slurrification section (3) that is containing the slurrifying liquid from step d), f) making in the slurrification section (3) a slurry of the filter cake with the slurrifying liquid, g) discharging the slurry from the slurrification section (3), and wherein optionally the filter cake formed in step b) is dried prior to step e).

The filter element (2) is having two sides wherein one side is suitable for building up a filter cake and another side is suitable for contact with filtered liquid. When the filter system is in operation, a separation will take place at the level of the at least one filter element (2). The solids from a liquid-containing-solids will build up on one side of the at least one filter element (2) (is the filter cake side). The liquid from the liquid-containing-solids will be able to pass through the filter element (2). The other side of the at least filter element (2) is suitable for contact with the filtered liquid (is the filtered liquid side).

The process steps of the process take place in the filter system according to the invention. In one aspect of the invention the process uses the filter system of the invention wherein the at least one filter element (2), has no connection with a vessel for input of a liquid under pressure into the side which is suitable for contact with filtered liquid.

The side of the at least one filter element (2) which is suitable for contact with filtered liquid does not have a means to displace under pressure a liquid from a vessel. The side of the at least one filter element (2) which is suitable for contact with the filtered liquid does not have a means to displace under pressure a cleaning liquid from a vessel connected to this side into the other side of the at least one filter element (2) where the filter cake, or the remaining of the filter cake, is located.

The "liquid-containing-solids" is containing more than 0% and up to 10% of solids. In another aspect of the invention, the liquid containing solids is comprising up to 8% of solids, up to 7%, up to 6%, up to 5%, up to 4%, up to 3% of solids.

The "slurry" is containing more solids than the corresponding "liquid-containing-solids". In one aspect of the invention, the slurry is containing from 15% to 50% solids, from 20% to 45%, from 25% to 40%, from 27% to 35%, from 29% to 33%. The slurry is pumpable.

In step a) of the process according to the current invention, the liquid-containing-solids are introduced into the filter system according to the invention. The filter system has a housing (1) comprising an aperture (6) for liquid-containing-solids, and a discharge outlet (5) suitable for discharging a slurry, and characterized in that a) the housing (1) of the filter system is comprising a slurrification section (3) and at least one filter element (2) having two sides wherein one side is suitable for building up a filter cake and another side is suitable for contact with filtered liquid, and b) the slurrification section (3) is comprising the discharge outlet (5), the aperture (6), at least one nozzle (4) for steam or gas injection, and, optionally, an aperture (9) that is able to regulate the quantity of a slurrifying liquid in the slurrification section (3).

The liquid-containing-solids is introduced into the filter system below the at least one filter element through the aperture (6) in the slurrification section (3). The liquid-containing-solids is filling up the housing (1) of filter system.

In step b) of the process according to the current invention, the liquid-containing-solids is separated into a filtered liquid and a filter cake while passing through the at least one filter element (2). The solids are remaining on one side of the at least one filter element (2), thus forming the filter cake. The liquid is passing through the at least one filter element (2) towards the side of the at least one filter element (2) which is suitable for contact with filtered liquid. The at least one filter element (2) in the process according to the current invention may be a plate filter element, a leaf filter element or a pulse tube filter element, a candle filter element or any type of filter element that can be operated under reduced oxygen content compared to oxygen content in atmosphere, preferably oxygen free. It can be operated in a discontinuous, or batch-wise process.

Preferably the at least one filter element (2) is a vertical leaf filter element. Preferably the filter system of the present invention is comprising more than one vertical leaf filter element.

The filter system can be operated under reduced oxygen content compared to oxygen content in atmosphere, preferably oxygen free. It can be operated under vacuum or under nitrogen gas.

While the liquid-containing-solids passes through the filter elements, a cake of solids (i.e. filter cake) is gradually building up against the filter elements until the filtration process is stopped and/or until the desired amount of filter cake is built up on the filter plates. The remaining liquid in the at least one filter element (2) may be further pushed through the at least one filter element (2), preferably the a least one vertical leaf filter element, by injecting steam or gas via the inlet (7) in the filter system. There may still be liquid-containing-solids in the slurrification section (3) that is not pushed through the at least one filter element (2) and it may be discharged through aperture (6). Preferably the liquid-containing-solids remaining in the slurrification section (3) can be used or can be partially used as slurrifying liquid in step d). The quantity of the liquid-containing-solids remaining in the slurrification section (3) can be regulated by outlet (6) and fine-tuned by the aperture (9).

In step c) of the present process, the filtered liquid is collected. The filtered liquid may be discharged through the connection (10) to the discharge outlet (8).

The steps a) to c) may be repeated one time, several times or until the steps are stopped or until the at least one filter element (2) is saturated. "Saturated" in this context means that the at least on filter element is filled to a certain extend with filter cake such that beyond that point the process becomes less effective, or ineffective. Further continuation of steps a) to c) may result in insufficient separation and/or built-up of pressure, and the like. The person skilled in the art has the ability to determine when the repetition of steps a) to c) will be stopped.

When steps a) to c) or the repetition of steps a) to c) is stopped, step d) will start.

In step d) of the process according to the current invention, a slurrifying liquid is provided through the aperture (6) and/or optionally, aperture (9) into the slurrification section (3). In one aspect of the invention the slurrifying liquid is provided through the aperture (6) and/or aperture (9) into the slurrification section (3). In another aspect the slurrifying liquid is provided through the aperture (6) and the aperture (9) into the slurrification section (3).

The slurrifying liquid may be a filtered liquid that has already passed the filtration step or it can be an unfiltered liquid or a blend of both. Preferably the slurrifying liquid is unfiltered liquid e.g. the liquid-containing-solids. Preferably the slurrifying liquid is liquid-containing-solids that is remaining in the slurrification section at the end of steps a) to c). The quantity of the liquid-containing-solids remaining in the slurrification section (3) can be regulated by aperture (6) and fine-tuned by the aperture (9). Preferably, the slurrified liquid is used in an amount such that the obtained slurry is pumpable. If the quantity of the liquid-containing-solids remaining in the slurrification section (3) is too high and would result in a diluted slurry, the excess of the liquid will be discharged through aperture (6) and optionally fined-tuned by aperture (9). More preferably, the quantity of liquid-containing solids in the slurrification section (3) will be regulated by the aperture (9) which is equipped with a gooseneck drain.

The slurrifying liquid is not a cleaning liquid. In the existing art, a cleaning liquid is expected to enter the filter element through the side which is suitable for contact with filtered liquid. In the process of the present invention, the slurrifying liquid is not entering the filter system through the side of the at least one filter element (2) which is suitable for contact with filtered liquid.

Upon dropping the filter cake into the slurrification section (3), the ratio of solids to liquid in the slurry may be fine-tuned by discharging more or less of the slurrifying liquid through the aperture (9).

In step e) of the process according to the current invention, the formed filter cake is dropped in the slurrification section (3) that is containing slurrifying liquid from step d). The dropping of the filter cake from the filter elements can be performed by means of gravity and/or vibration of the filter elements and/or back-pressure. Said back-pressure is generated by gas and/or steam. Preferably the filter cake can be dropped from the filter elements by means of gravitation and/or vibration of the filter elements. According to one aspect of the invention, the filter cake is dropped from the at least one vertical leaf filter element by vibration of the leaf filters and by gravitation.

The filter system in the process according to the invention allows the dropping of the filter cake into the slurrification section (3) under reduced oxygen content compared to oxygen content in atmosphere, preferably oxygen free.

In step f) of the process according to the current invention, a slurry is made from the filter cake and the slurrifying liquid that is present in the slurrification section (3). Through the at least one nozzle (4) in the slurrification section (3) of the filter system, steam or gas may be injected and it may help the slurrification of the filter cake. Preferably the slurrification section (3) has more than one nozzle for gas or steam injection that may allow an even better agitation and/or slurrification of the filter cake into the liquid. Preferably the slurrification section (3) has up to 10 nozzles per meter circumference of the slurrification section (3), preferably from 1 to 6 nozzles per meter circumference Preferably, the nozzles are spread over the walls of the slurrification section (3) and allow agitation of the slurry in the slurrification section (3).

The nozzles improve the agitation of the slurry.

Preferably the nozzles are placed lower than half of the height of the slurrification section (3).

By performing the process according to the present invention the solids of the slurrified filter cake may be prevented to sediment and/or to stick to the bottom and/or the walls of the slurrification section (3). Once the solids sediment, it may be very difficult to detach them again. The process according to the present invention will result in a good and homogeneous slurrification and/or prevent sedimentation and/or sticking of solids to the bottom and/or the walls of the slurrification section (3). Preferably, the nozzle (4) is contributing to a better agitation of the slurry. The aperture (6) and more specifically the aperture (9) can regulate the quantity of liquid-containing-solids in the slurrification section (3) and thus contribute to the pumpability of the slurry.

Preferably, the lower part of the slurrification section of the filter system applied in the process according to the invention has a conical shape. More preferably the entire slurrification section (3) has a conical shape. The cone may have an angle of from 30 to 80 degrees, preferably 50 to 70 degrees. The slurry is potentially free to slide from the broad end of the cone to the narrow end, where the discharge is taking place.

In one aspect of the invention, the filter cake formed in step b) can be dried prior to step e).

The drying of the filter cake, especially formed by filtration on the at least one vertical leaf filter element, will facilitate the dropping of the filter cake. The at least one filter element, in particular the at least one vertical leaf filter element will be clean and there is less, or almost no need for a cleaning cycle between different filtration processes.

Finally, in step g) of the process according to the current invention, the slurry of the filter cake is discharged from the slurrification section (3) through the discharge outlet (5).

In one aspect of the invention, the process is further comprising, following to step g), the step of using the slurry into a process step prior to step a) of the filtration process. This further step prior to the filtration process amounts to a re-cycle of the slurry. The solids of the slurry are re-used as adsorbent and/or catalyst. The slurry is not discarded as waste material. The solids are re-used for their corresponding functional properties.

In another aspect of the invention, the process is performed under reduced oxygen content, preferably at least 40%, at least 50%, at least 60%, at least 70% reduced, compared to oxygen content in atmosphere. It can be performed under vacuum or in nitrogen atmosphere. It allows the re-use of the slurrified filter cake.

In the process according to the current invention the slurrification of the filter cake is taking place in one and the same housing (1) of the filter system. The presence of the at least one nozzle (4) in the slurrification section (3) allows amongst others the slurrification in the same housing (1). There is no need for specific discharge outlet between the slurrification section (3) and the side of the at least one filter element (2) which is suitable for building up the filter cake. There is no need for specific connection valves and the like. There is no need for an extra agitation vessel for the slurrification of the filter cake. Consequently it is more easy to run the process according to the invention under reduced oxygen content compared to oxygen content in atmosphere, preferably to operate the filter system oxygen free. As a result, the slurry is less prone to reduction of the quality of the slurrified solids. Discharging a slurry of the filter cake allows better the re-use of the slurry in a process step prior to the filtration process. No or minor disposal of the filter cake is needed or it does not need to be wasted as a low quality material.

In a process existing in the art, which is using the existing filter systems, (see FIG. 2) the liquid-containing-solids is introduced into the filter system via the inlet (C) situated under the filter elements in the conical part of the filter system. The liquid-containing-solids is filling up the whole filter system and is then passing through the filter elements where the solids are remaining on the filter elements and the filtered liquid is removed via discharge nozzle (G). The filter cake is built up in the filter elements of the filter system until the end of the filtration process or until the filter elements are completely filled. The remaining liquid is further pushed through the filter by steam or gas via the inlet (F) in the filtering section (B) until no more fluid is remaining in the filtering section (B). The remaining liquid-containing-solids in the conical part of the filter system is discharged through outlet (C). The filter cake is dried and is falling into the emptied conical part of the filter system and is discharged through the discharge outlet (E) into the separate agitation vessel (D), which is further equipped with an agitator (H).

Since the filter cake, when detaching from the filter and being discharged, is in the form of large lumps, there is a risks to block the discharge outlet (E). Therefore the discharge outlet of the existing filter systems needs to be large. This makes it more difficult to operate the equipment under vacuum or gas and avoid leakages of air into the system which can lead to loss of quality of the solids in the filter cake and exclude them from being re-used in a process step prior to the filtration process. This existing system thus asks for more stringent requirements of the discharge outlet, needs more space and it is more difficult to work under reduced oxygen content compared to oxygen content in atmosphere.

In a process existing in the art for obtaining and subsequently slurrifying a filter cake, wherein filter system with vertical leaf filters is applied, the formed filter cake is not dried. It is difficult to remove the wet filter cake from the filter elements such as vertical leaf filters, and the sequence of filtration processes is interrupted frequently to clean the filter elements.

Surprisingly, the process according to the current invention may avoid that the filter cake is sticking to the filter system once the filter cake is dropped. It may result in a cleaner filter system that needs less extra cleaning operations in-between the filtration processes of the present invention. The process according to the current invention allows to slurrify the filter cake into a homogeneous, pumpable and re-usable slurry of solids.

Additionally, the process of the current invention allows for a slurrification of the formed filter cake, which allows for a more simplified discharge outlet (5) compared to the discharge outlet suitable for a dry filter cake. The discharge is facilitated in that the slurry is pumpable. The discharge outlet (5) of the filter system of the current invention is usually smaller than existing filter systems that are equipped to discharged a dry filter cake. The current process further provides for a reduced risk of contact with oxygen and has a positive impact on the quality of solids of the slurrified filter cake. Amongst others, the process of the current invention allows for a better protection against oxygen exposure. As a result, the slurry is less prone to reduction of the quality of the slurrified solids. Discharging a slurry of the filter cake allows better the re-use of the slurry in a process step prior to step a) of the filtration process. No disposal of the filter cake is needed or it does not need to be wasted as a low quality material.

In one aspect of the invention, the liquid in the liquid-containing-solids is an edible oil that can be provided in any stage of its refining process, including, but not limited to, for example crude oil, degummed oil, oil treated with an adsorbent (such as bleaching earth, silica, active carbon, or the like and mixtures thereof), deodorized oil or mixtures of two or more thereof.

The edible oils are derived from any type, source or origin. It may relate to vegetable oils or fats, animal oils or fats, fish oils, microbial oils or algae oils, preferably edible oils. They may be derived, for example, from one or more vegetable and/or animal sources and may include oils and/or fats from a single origin or blends of two or more oils and/or fats from different sources or with different characteristics. They may be derived from standard oils or from specialty oils such as low 3-MCPD esters oils (3-MCPD=3-monochloropropane-1,2-diol), low GE-oils (GE=glycidyl esters), from modified or unmodified oils and/or fats (i.e. from oils in their natural state or oils that have been subjected to a chemical or enzymatic modification, to a hydrogenation, or to fractionation) and so on. Preferably, they will be derived from vegetable oils or vegetable oil blends. Examples of suitable vegetable oils include: soybean oil, corn oil, cottonseed oil, linseed oil, olive oil, palm oil, palm kernel oil, coconut oil, peanut oil, rapeseed oil, safflower oil, sunflower oil, sesame seed oil, rice bran oil, canola oil, babassu oil, cohune oil, tacum oil, cuphea oil, and any fractions or derivatives thereof. Palm oil is encompassing palm oil, as well as palm oil fractions such as stearin and olein fractions (single as well as double fractionated, and palm mid fractions) and blends of palm oil and/or its fractions. According to one aspect of the invention the liquid in the liquid-containing-solids is an edible oil selected from the group consisting of soybean oil, corn oil, cottonseed oil, linseed oil, palm oil, palm kernel oil, coconut oil, rapeseed oil, safflower oil, sunflower oil, canola oil, and mixtures of two or more thereof.

In another aspect of the invention, the solids in the liquid-containing-solids are adsorbents, preferably a bleaching adsorbent. In one aspect of the invention, the solids are selected from the group consisting of bleaching earth, silica, active carbon, and mixtures thereof. According to one aspect of the invention, the liquid-containing-solids is an edible oil containing adsorbent selected from the group consisting of bleaching earth, silica, active carbon, and mixtures thereof.

Bleaching adsorbent is used in a bleaching step, which is a step in the overall refining process of edible oils. A crude or partially refined oil is delivered to a bleaching system. The nature and operation of the bleaching system will depend, at least in part, on the nature and quality of the edible oil being bleached. Generally, the raw or partially refined oil will be mixed with a bleaching adsorbent which combines with oxidation products, trace phosphatides, trace soaps, and other compounds adversely affecting the colour and flavour of the oil. As is known in the art, the nature of the bleaching agent can be selected to match the nature of the crude or partially refined oil to yield a desirable bleached oil.

Bleaching adsorbents generally include neutral, natural, physically or chemically "activated" bleaching clays, also referred to as "bleaching earths", activated carbon and various silicates or mixture of two or more thereof. In one aspect of the invention, the adsorbent is a chemically activated adsorbent (such as acid activated). In another aspect of the invention, the adsorbent is a physically activated adsorbent (such as thermal activation by means of heat and/or microwave treatment).

In one aspect of the invention, step b) of the process is separating the bleaching adsorbent from the edible oil. More specifically, it relates to a process for obtaining a filtered oil and slurrifying a filter cake of bleaching adsorbent and the process is comprising the following steps in order:
a) Bringing a bleached edible oil which is containing bleaching adsorbent into a filter system according to the present invention
b) separating said oil into a filtered oil and a filter cake of bleaching adsorbent,
c) collecting the filtered oil,
d) providing through the aperture (6) and/or, optionally, aperture (9) a slurrifying edible oil in the slurrification section (3),
e) dropping the in step b) formed filter cake into the slurrification section (3) that contains the slurrifying edible oil from step d),
f) making in the slurrification section (3) a slurry of the filter cake with the slurrifying edible oil,
g) discharging the slurry from the slurrification section (3), and wherein optionally the filter cake formed in step b) can be dried prior to step d).

The slurry of the filter cake and the slurrifying edible oil is made in the slurrification section (3) by further introducing steam or a gas for agitation purpose through the at least one nozzle (4).

Performing all the process steps at reduced oxygen content compared to oxygen content in atmosphere, preferably oxygen free may avoid amongst others the oxidation of the edible oil and bleaching adsorbent, and/or allows the re-use of the bleaching adsorbent in a refining process. All steps are performed in presence of reduced oxygen content, preferably at least 40%, at least 50%, at least 60%, at least 70% reduced compared to oxygen content available in atmosphere.

In one aspect of the invention, before dropping the in step b) formed filter cake into the slurrification section (3), the filter cake of bleaching adsorbent is dried, preferably with steam, prior to being dropped in step e). The dried filter cake is dropped into the slurrification section (3) that is containing slurrifying edible oil. The slurrification section (3) is filled or partially filled with this slurrifying edible oil, preferably oil containing adsorbent, more preferably bleached edible oil containing bleaching adsorbent. Through the at least one nozzle (4), steam or gas is injected and the slurrification of the dried filter cake and the oil is facilitated. The slurry can be collected by passing it through the discharge outlet (5).

In yet another aspect of the invention, the process further comprises the use of the slurry of the filter cake into a process step wherein the solids of the slurry are used as adsorbent. In a more specific aspect of the invention the filter cake of bleaching adsorbent is recycled into a bleaching step of refining of oils, preferably edible oils.

Preferably the invention further relates to a filtration process for obtaining a filtered edible oil and slurrifying a filter cake of bleaching adsorbent, and the process is comprising the following steps:
a) Bringing a bleached edible oil containing bleaching adsorbent into a filter system with a housing (1) comprising an aperture (6) for a bleached edible oil which is containing bleaching adsorbent, and a discharge outlet (5) suitable for discharging a slurry, and characterized in that the housing (1) of the filter system is comprising a slurrification section (3) and at least one filter element (2) having two sides wherein one side is suitable for building up a filter cake of bleaching adsorbent and another side is suitable for contact with filtered edible oil, and
the slurrification section (3) is comprising the discharge outlet (5), the aperture (6), at least one nozzle (4) for steam or gas injection, and, optionally, an aperture (9) that is able to regulate the quantity of a slurrifying edible oil in the slurrification section (3), and
wherein the at least one filter element (2), has no connection with a vessel for input of a liquid under pressure into the side of the at least one filter element (2) which is suitable for contact with filtered edible oil, and
b) separating said oil into a filtered edible oil and a filter cake of bleaching adsorbent,
c) collecting the filtered edible oil, optionally repeat step a) to c) until the at least one vertical filter element (2) is saturated,
d) Regulate the quantity of a bleached edible oil which is containing bleaching adsorbent present in the slurrification section (3) with the outlet (6) and fine tune the quantity with the aperture (9),
e) dropping the in step b) formed filter cake into the slurrification section (3) that contains the slurrifying edible oil from step c),
f) making in the slurrification section (3) a slurry of the filter cake with the slurrifying edible oil,
g) discharging from the slurrification section (3) the slurry, and wherein the filter cake formed in step b) is dried prior to step e).

Furthermore, the invention relates to the use of the filter system according to the present invention to make a re-usable slurry of a filter cake. In the same housing (1), a slurrification section (3) is present and a slurry of the cake is made in the filter system. Furthermore, the filter system is used to discharge a slurry of filter cake.

According to another aspect of the invention, the filter system is used under reduced oxygen content compared to oxygen content in atmosphere to obtain a slurry that can be re-used as adsorbent, preferably the adsorbent is a bleaching adsorbent in refining process of oils, more preferably edible oil.

In a further aspect of the invention, in the use of the present invention the re-usable slurry is used in a bleaching step of edible oils.

The current invention has at least the following advantages over filter system and/or filtration processes existing in the art:

One housing (1) is comprising the at least one filter element (2) and slurrification section (3); thus less space-occupying.

There is no need for an additional agitation vessel.

There is no need for a specific discharge outlet between the at least one filter element (2) and slurrification section (3).

There is no special discharge outlet for dry filter cake needed.

The complete system can operate under reduced oxygen content compared to oxygen content available in atmosphere.

The filter system itself is used to make a slurry by dropping a filter cake into a slurrifying liquid, preferably a dried filter cake.

The drying of the filter cake allows obtaining clean filter elements, preferably clean vertical leaf filter elements.

The filter system, wherein the at least one filter element (2) has no connection with a vessel for input of a liquid under pressure into the side of the at least one filter element (2) which is suitable for contact with filtered liquid, allows slurrification of the filter cake in the same housing (1) and the obtained slurry can be re-used.

The slurrification is facilitated by injecting steam or gas through the at least one nozzle (4) in the slurrification section (3).

The recuperated filter cake is discharged as a slurry, and the slurry can be re-used.

The content of solids in the slurry can be regulated, and preferably fine-tuned by the aperture (9).

The slurry of the filter cake wherein the liquid is an edible oil and the solids are bleaching adsorbent, is not disposed as waste but can be re-used in the refining process of edible oils.

The invention claimed is:

1. A filtration process comprising the steps of:
introducing a mixture of liquid and solids into a filter vessel having an upper cylindrical section surrounding at least one filter, and a lower conical section, the mixture being introduced through an aperture (6) in the lower conical section;
forcing the liquid to flow through the at least one filter to form a filtrate downstream of the filter that exits the filtration vessel through a filtrate discharge outlet (8), while a filter cake of solids accumulates on an upstream surface of the at least one filter;
stopping the flow of the liquid through the at least one filter;
removing any remaining liquid from the filter vessel after the flow of liquid has been stopped;
drying the filter cake;
introducing a slurrifying liquid into the lower conical section through at least the aperture (6) in the lower conical section;
regulating the quantity of slurrifying liquid in the filter vessel via a second aperture (9) extending through the wall of the cylindrical section;
causing any accumulated filter cake to fall from the at least one filter into the lower conical section after the accumulated filter cake has been dried;
injecting steam or gas into the lower conical section through at least one injection nozzle extending through the wall of the lower conical section, to agitate and cause the slurrifying liquid and any fallen filter cake to form a slurry in the lower conical section; and
discharging the slurry formed in the lower conical section out through a discharge outlet (5) disposed in the lower conical section.

2. The filtration process of claim 1 wherein the liquid introduced with the mixture is an oil.

3. The filtration process of claim 2 wherein the oil is edible.

4. The filtration process of claim 1 wherein the solids introduced with the mixture comprise a bleaching adsorbent.

5. The filtration process of claim 1 further comprising a step of applying a vacuum to the interior of the filter vessel.

6. The filtration process of claim 1 wherein drying the filter cake is accomplished by introducing steam into the filter vessel.

7. The filtration process of claim 1 wherein the filter cake is caused to fall by vibrating the at least one filter and the action of gravity.

* * * * *